Feb. 23, 1960     R. BECKADOLPH     2,925,623
PNEUMATIC TIRE FOR VEHICLES AND METHOD OF MAKING SAME
Filed July 3, 1953         2 Sheets-Sheet 1
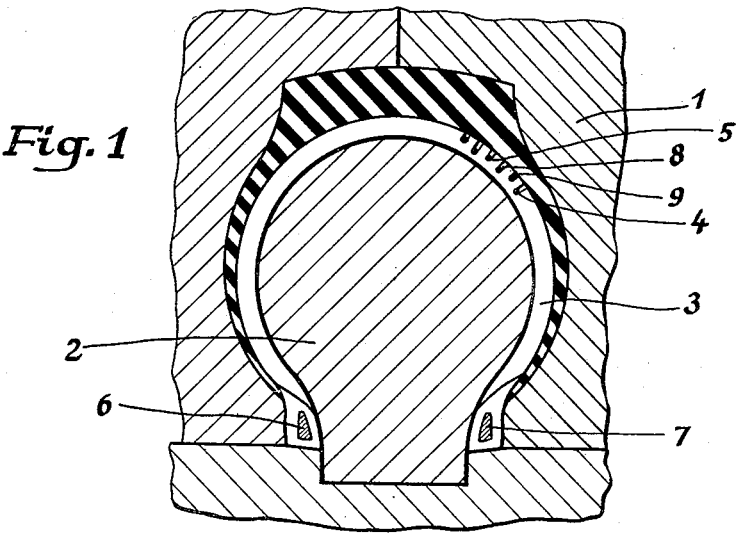
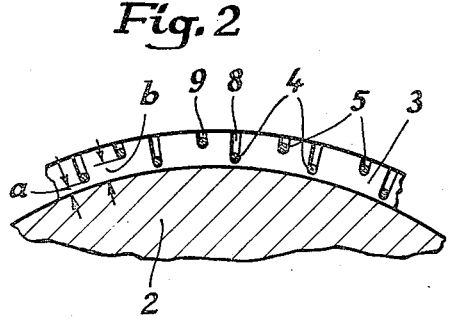
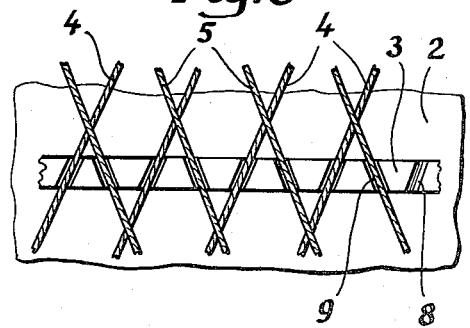
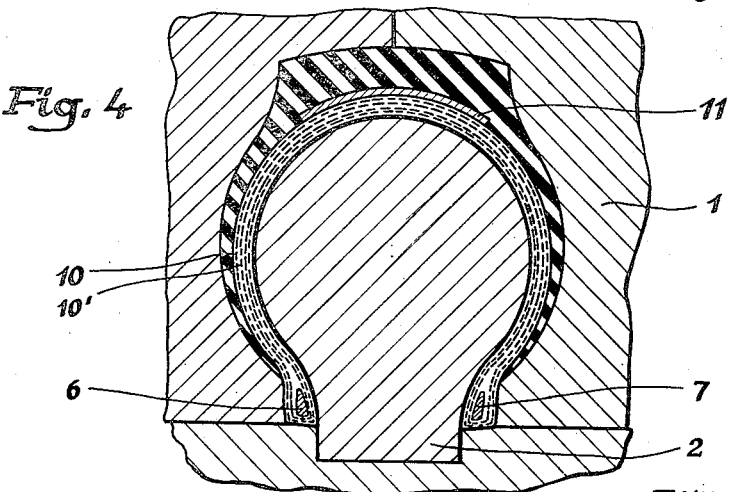
INVENTOR:
Richard Beckadolph

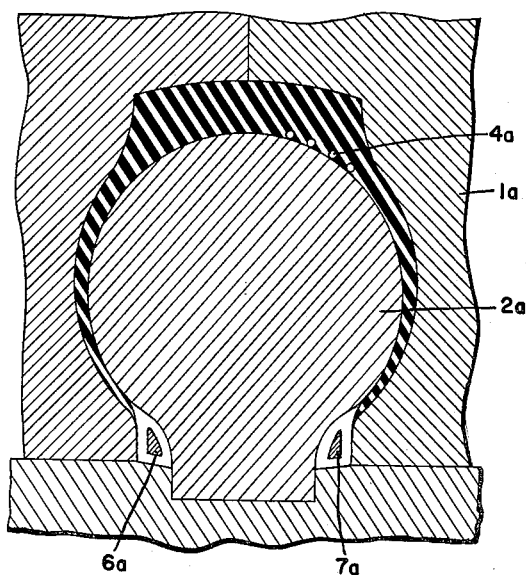

United States Patent Office 2,925,623
Patented Feb. 23, 1960

2,925,623

PNEUMATIC TIRE FOR VEHICLES AND METHOD OF MAKING SAME

Richard Beckadolph, Grasdorf uber Hannover, Germany, assignor to Continental Gummi-Werke Aktiengesellschaft, Hannover, Germany Application July 3, 1953, Serial No. 365,870

7 Claims. (Cl. 18—59)

The present invention relates to pneumatic tires and a method of making same and, more specifically, is directed to the making of pneumatic tires from pourable elastomers, especially meltable high-polymers, with reinforcements embedded in said elastomers. Such elastomers as for instance polyurethanes, polyamides and the like are adapted to be molded under pressure and under simultaneous application of heat, or can be poured or cast and subsequently pressed if said elastomers are in a not fully reacted state of aggregation. Therefore, such elastomers are particularly suitable for making moulded articles without reinforcements, and it is relatively simple to produce molded articles of this type.

However, heretofore, great difficulties have been encountered when an attempt was made to produce from elastomers articles with reinforcements therein, as for instance pneumatic tires for vehicles. The reason for this difficulty consists in that the reinforcements must occupy a predetermined position and must maintain this position during the manufacturing process.

It is, therefore, an object of this invention to provide a method of making pneumatic tires from elastomers, which will overcome the above outlined difficulties.

It is another object of this invention to provide a method of making pneumatic tires from elastomers, which will make it possible to provide the tires with one or more reinforcing layers.

It is still another object of this invention to provide a pneumatic tire made of elastomers and containing reinforcing means.

These and other objects and advantages of the invention will appear more clearly from the following specification in connection with the accompanying drawings, in which:

Fig. 1 illustrates a radial section through a pneumatic tire and a mold containing same.

Fig. 1a is a section through a tire and a mold slightly modified over that of Fig. 1.

Fig. 2 shows a mandrel used in connection with the method according to the present invention and provided with a rib-like elevation.

Fig. 3 is a top view of the structure shown in Fig. 2.

Fig. 4 represents a section similar to that of Fig. 1 and illustrates a somewhat modified method of making pneumatic tires.

General arrangement

According to the present invention, first the reinforcing means are placed on a mandrel which is inserted into a mold corresponding to the shape of the tire to be made. The mold may have a shape similar to conventional molds for making customary pneumatic tires for vehicles. The elastomer which is intended to form the tire is poured into the mold and, if desired, is subjected to pressure.

Preferably, the reinforcing means which is anchored at the cores of the beads is pulled or stretched over said mandrel through the intervention of ribs or elevations provided on said mandrel. However, the invention is not limited to the employment of such ribs or elevations. It is also possible to omit said ribs or elevations and to mount the reinforcing means on an elastic mandrel.

Structural arrangement

Referring now to the drawing in detail, Fig. 1 shows a portion of a mold 1 the inner surface of which defines the outer contour of the tire to be formed. Mounted within the mould 1 is a mandrel 2 which, while determining the inner surface of the tire to be formed, confines with said mold a torus-shaped hollow space or chamber determining the shape of the tire. Provided on the mandrel 2 are elevations in form of ribs 3 which extend transverse to the mandrel 2. However, if desired, the ribs 3 may extend in the rolling direction of the tire to be formed or at an acute or obtuse angle to said rolling direction.

It may be assumed that two reinforcing layers 4, 5 of organic or inorganic material are to be applied (Fig. 3), while their threads, strands, or wires are connected to the cores 6, 7 of the beads and extend at an angle with regard to each other. In order to be able to stretch the layers 4, 5 over the mandrel 2 so that said threads, strands or cables will on one hand maintain their predetermined positions and on the other hand will remain spaced from the mandrel 2 without contacting each other, the rib 3 is provided with depressions, especially grooves 8, 9, which are engaged by the respective reinforcing means 4, 5. The direction in which said depressions or grooves extend corresponds to the angle which the threads, strands, cables or the like of the reinforcing means are intended to form with each other. The width of said depressions or grooves is, of course, determined by the thickness or diameter of the employed threads, strands or the like. The bottom of the grooves 8 is spaced by a distance $a$ and the bottom of the grooves 9 is spaced by a distance $b$ from the surface of the mandrel 2 so that layer 5 will not contact layer 4, and layer 4 will not contact the mandrel 2.

The thus covered mandrel 2 is then inserted into the mold 1, whereupon the tire material is poured into the mould, thereby forming the tire. During the pouring or casting process, the liquid elastomers flow around the threads, strands or the like of the layers 4, 5 so that after the poured or cast material has solidified, the individual threads or the like are solidly connected and united with the tire material and occupy the desired position within the tire. In order to obtain an intimate connection between the threads or the like of the reinforcing means and the poured material, the threads or the like prior to their mounting on the mandrel 2 are soaked in or covered with elastomers. The depressions produced in the interior of the tire by the above mentioned elevations or ribs 3 are subsequently either pressed out by an elastic smooth preferably heatable mandrel or they are filled in by liquid elastomers according to the centrifugal casting method. These last mentioned steps are not necessary when a smooth mandrel 2 is employed onto which, prior to the placing of the layers 4, 5 thereon, elevations or ribs of elastomers are cast. Said elevations or ribs unite with the tire material during the pouring or casting of the latter.

Fig. 1a illustrates a mold which differs from that of Fig. 1 in that the ribs or elevations 3 have been omitted. Therefore, all parts corresponding to those of Fig. 1 have been designated with the same reference numerals as in Fig. 1 but with the additional character "$a$." The method of making a tire with the mold of Fig. 1a corresponds to that described in connection with the mold of Fig. 1. As with the method in connection with Fig. 1, also with the method relating to Fig. 1a, the reinforcing strands 4a are anchored at the cores 6a, 7a of the bead.

In conformity with a modification of the method according to the present invention, a tire may also be produced by first embedding fabric layers in elastomers according to the coating method while said elastomers are maintained in plastic condition over a longer period of time by retarding the reaction. From said fabric layers there is built up a tire carcass which is then stretched over a smooth mandrel. The thus covered mandrel is then inserted into the tire mold whereupon the tread portion and the side portions of the tire are cast on.

In conformity with another modification of the method according to the invention (Fig. 4), fabric layers 10, 10′ are, according to the casting method, covered with elastomers which by means of reaction retarders such as adipic acid are made to cross-link or cyclicize only slowly. Thereupon, during the period within which the elastomers pass through their plastic phase, the thus treated fabric layers are built up to form a tire carcass which latter together with a pre-cast tread portion is formed into a tire blank or unfinished tire. The reference numeral 11 designates a breaker strip. The thus built up unfinished tire is then stretched over an elastic tire mandrel and in a tire mould is pressed into its final tire shape.

In conformity with the modification of the invention, shown in Fig. 1a, a mold 1a is provided, which together with mandrel 2a, forms a torus-shaped hollow space corresponding to the shape of the tire. According to this modification, the mandrel 2a is characterized by a smooth face, whereon are supported the reinforcing strand elements 4a the ends whereof are secured to cores 6a and 7a.

It is, of course, understood that the present invention is by no means limited to the particular constructions shown in the drawings but also comprises any modifications within the scope of the appended claims.

What I claim is:

1. A method of making a pneumatic tire for vehicles from elastomers adapted to be melted and to be molded, especially meltable high polymers, which includes the steps of: providing bead cores for the tire to be made; placing and stretching thread-like reinforcing means over a mandrel; anchoring the ends of said reinforcing means in stretched condition thereof on said bead cores to non-displaceably secure said reinforcing means on said mandrel; inserting said mandrel with said reinforcing means thereon into a mold; and casting the tire by filling said mold with molten elastomeric material.

2. A method according to claim 1 wherein said mandrel is provided with ridge-like elevations, and said reinforcing means are spaced in predetermined positions by said elevations.

3. A method according to claim 1 wherein said mandrel is provided with a smooth face.

4. A method of making pneumatic vehicle tires from a castable elastomer adapted to be melted and to solidify at normal temperature, especially castable high polymers, which includes the steps of: preparing bead cores for a tire to be made and mounting the same on a tire mandrel, non-displaceably placing and stretching reinforcing means over said mandrel, anchoring said reinforcing means on said bead cores, inserting said mandrel together with said reinforcing means and said bead cores into a mold, pouring said elastomer in castable condition into said mold and around said reinforcing means, and following the solidification of said elastomers removing the tire from its mold and from said mandrel.

5. A method of making pneumatic tires for vehicles from elastomers adapted to be melted and also adapted to solidify at normal temperature, especially meltable high polymers, which includes the steps of: impregnating reinforcing means with an elastomer; placing and stretching said reinforcing means over a mandrel; non-displaceably securing said reinforcing means on said mandrel; inserting said mandrel with said reinforcing means thereon into a mold; and filling said mold with molten elastomer.

6. A method of making pneumatic tires for vehicles from elastomers adapted to be melted and also adapted to solidify at normal temperature, especially meltable high polymers, which includes the steps of: coating reinforcing means with an elastomer; placing and stretching said reinforcing means over a mandrel; non-displaceably securing said reinforcing means on said mandrel; inserting said mandrel with said thus stretched and secured reinforcing means into a mold; and filling said mold with molten elastomer.

7. A method of making a pneumatic tire for vehicles from elastomeric material adapted to be melted and to be molded, which includes the steps of: placing and stretching thread-like reinforcing means over a mandrel, non-displaceably securing the thus stretching reinforcing means on said mandrel, inserting said mandrel with said reinforcing means thereon into a mold, and casting the tire by filling said mold with molten elastomeric material.

References Cited in the file of this patent

UNITED STATES PATENTS

| | | |
|---|---|---|
| 1,316,274 | Clark | Sept. 16, 1919 |
| 1,380,085 | Walton | May 31, 1921 |
| 1,453,217 | Weigel | Apr. 24, 1923 |
| 1,577,050 | Weigel | Mar. 26, 1926 |
| 1,582,255 | Fairchild | Apr. 27, 1926 |
| 1,870,661 | Vogt | Aug. 9, 1932 |
| 1,960,120 | Mohring | May 22, 1934 |
| 1,964,540 | Shue | June 26, 1934 |
| 2,031,720 | Lee | Feb. 25, 1936 |
| 2,277,145 | Pierce | Mar. 24, 1942 |
| 2,313,035 | Breth | Mar. 9, 1943 |
| 2,441,071 | Jahant | May 4, 1948 |
| 2,493,614 | Bourdon | Jan. 3, 1950 |
| 2,621,166 | Schmidt et al. | Dec. 9, 1952 |
| 2,625,531 | Seeger | Jan. 13, 1953 |
| 2,640,523 | Palmer | June 2, 1953 |
| 2,672,914 | Weigold et al. | Mar. 23, 1954 |
| 2,686,554 | Hinman | Aug. 17, 1954 |
| 2,729,618 | Muller et al. | Jan. 3, 1956 |